Figure 5:
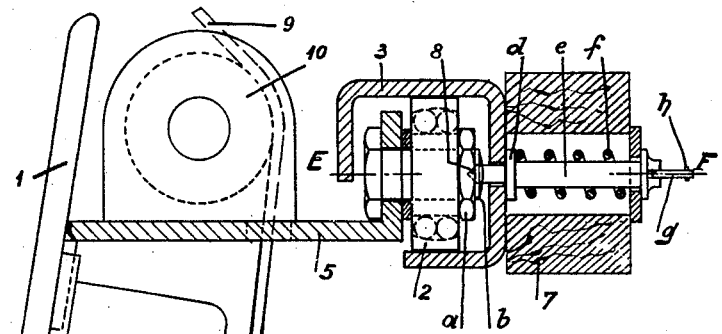

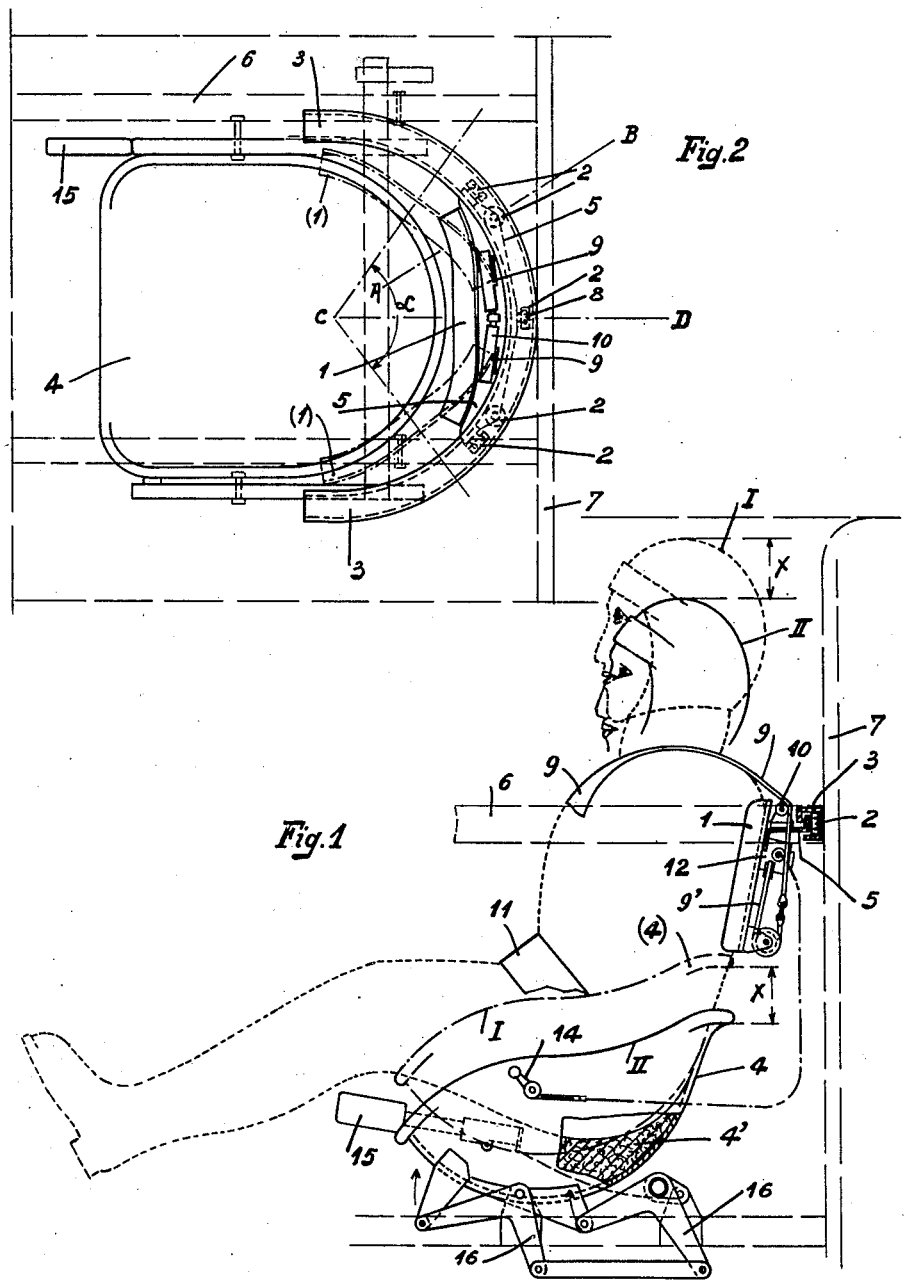

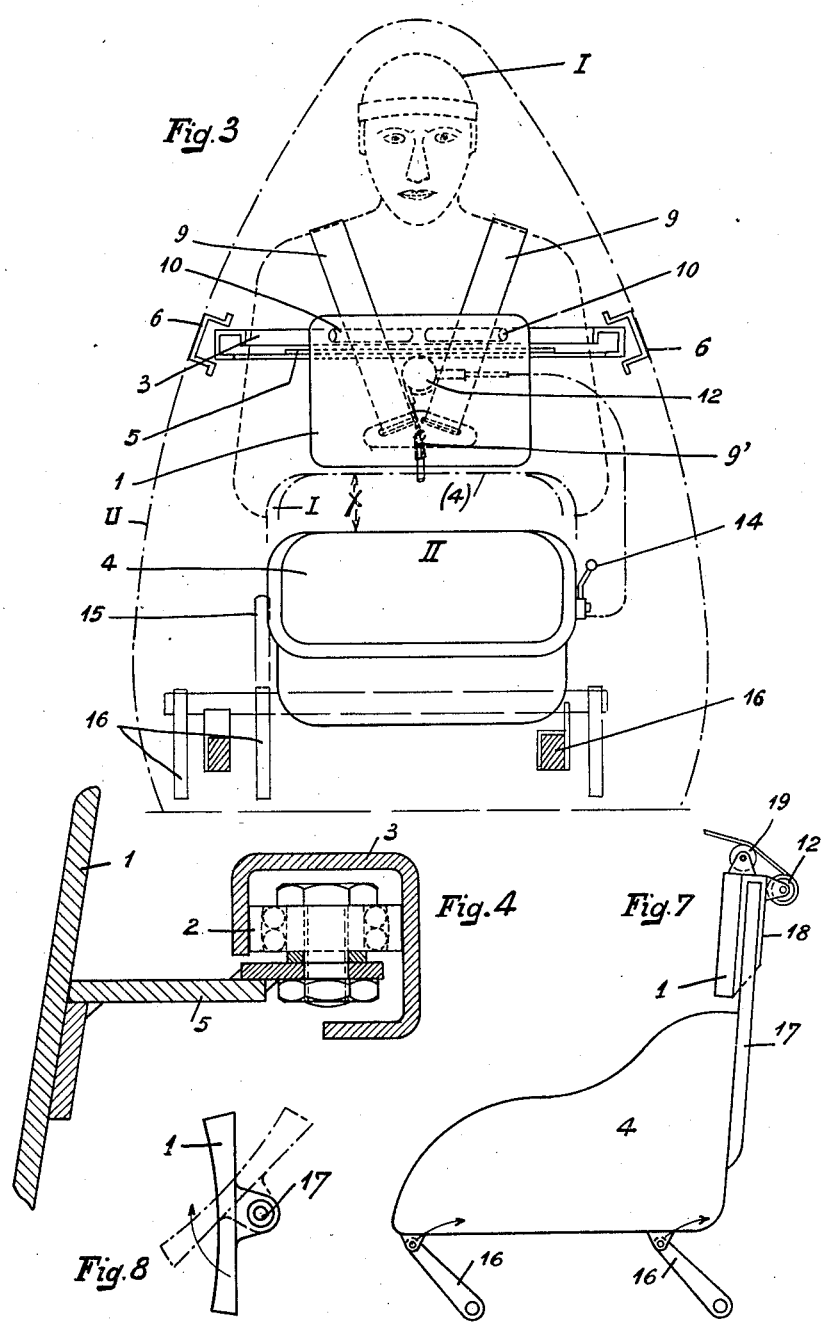

Feb. 28, 1939.  E. MEISSNER  2,148,953
ADJUSTABLE SEAT WITH MOVABLE BACK FOR AIRPLANES
Filed Oct. 19, 1937  3 Sheets-Sheet 3

Inventor:
Erich Meissner by
[signature] Atty.

Patented Feb. 28, 1939

2,148,953

UNITED STATES PATENT OFFICE

2,148,953

ADJUSTABLE SEAT WITH MOVABLE BACK FOR AIRPLANES

Erich Meissner, Seestadt Rostock, Germany, assignor to Ernst Heinkel, Warnemunde, Germany Application October 19, 1937, Serial No. 169,846
In Germany January 27, 1937

5 Claims. (Cl. 244—122)

The invention relates to an adjustable seat, especially for airplanes. Airplane pilots shall be able, from the seat, to look out rearwardly. This would indeed be possible by means of a laterally pivotable seat, but an airplane pilot must have his feet continually on the lateral steering pedals, so that these must also be movable. That would entail a complex construction.

In a seat construction according to the invention the problem is solved, by making the seat back movable independently of the seat proper, whilst the seat can either be fixed or in known manner adjustable vertically. The pilot can also, without moving the lower half of his body, swing the upper part of the body about its axis and then draw the head so far backwards that the field of view may extend through 360° in the horizontal plane. For the mobility of the seat back rotary parts or bent guide members and rollers may be employed. The guide members for the seat back may either be secured to the airplane body or be connected with the seat.

For the front and intermediate positions of the seat back an anchoring arrangement may be employed, so that the pilot must in this position sit completely still. The seat back can also be connected with the seat bottom by yielding or elastic means, but provision must be made for completely separating the two.

The backwards view is considerably facilitated if the pilot not only swings the upper part of the body sideways, but can also bend it forwardly. The seat construction presented by the invention is therefore provided with an arrangement whereby the securing belt for the upper part of the body can at will either be held fast or yieldingly.

This arrangement consists once of connecting elements to the airplane for the securing belt for the upper part of the body, and further of a change-over device by means of which a yielding member in the connecting elements can be switched in or out at will.

The securing belt for the upper part of the body can be connected at one end to the seat back, to the seat bottom or to a convenient fixed part of the airplane, whilst the fast or loose switch member for the belt or a Bowden wire and the like are conveniently arranged on the seat bottom, perhaps in the neighbourhood of the lever for the vertical adjustment of the chair.

As a result of the one-sided belt fastening to the seat back or to a fixed part of the airplane, it follows that at every upward vertical adjustment of the seat bottom the above mentioned yielding member must be switched in. Thus one may, for example, connect the switch arrangement with the vertical adjustment lever for the seat bottom. A fastening of the securing belt to the latter is not necessary.

Figure 6:
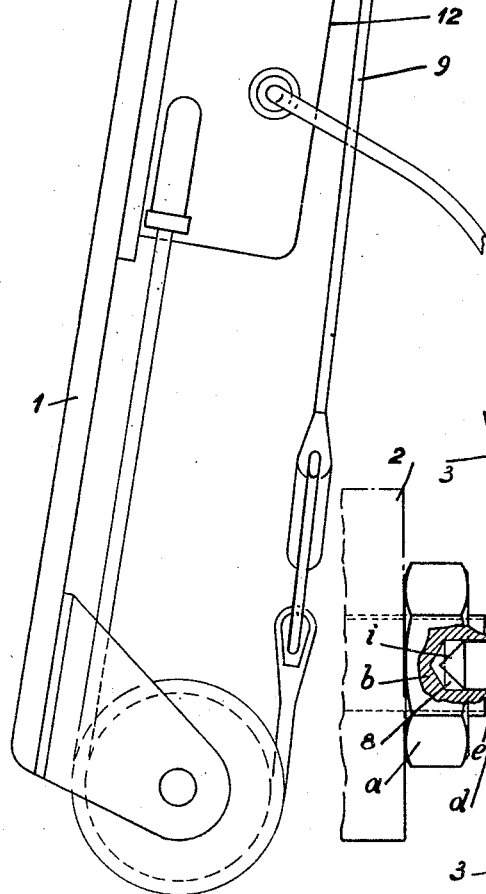

In the accompanying drawings,
Fig. 1 is an elevation of the seat construction;
Fig. 2 is a plan view;
Fig. 3 is a front elevation;
Fig. 4 is a section on the line A—B in Fig. 2;
Fig. 5 is a section on the line C—D in Fig. 2;
Fig. 6 is a horizontal section on the line E—F in Fig. 5;
Fig. 7 is a diagrammatic representation of an alternative embodiment of the invention; and
Fig. 8 shows the chair back, in plan view, in two positions.

The Figures 1 and 3 indicate the seat construction in two different vertical positions I and II, the full lines showing the lower and the dotted lines the upper position; the body positions of the pilot are similarly indicated. In Fig. 3 the contour of the airplane body is also included.

The seat back 1 is, in Figs. 1–3 disconnected or independent from the seat bottom 4. It is by means of rollers 2 adjustable in the arc-shaped bent guide-way 3, so as to be adjustable in a semicircle over the fixed seat 4. The roller bearings are connected by stays 5 with the seat back. In the present instance two horizontal and three vertical guide rollers are provided, the central vertical roller being disposed exactly on the section line C—D in Fig. 2.

The reciprocal arrangement of horizontal and vertical rollers ensures a true movement of the seat back 1 along the guide 3.

The semi-circular shaped guide 3 is secured to the horizontal stays 6 and 7 (Fig. 2) of the airplane body. It can also be secured to the seat 4 and includes in common with the stay 7 on the line C—D a support 8 (Figs. 5 and 6). The seat back 1 is also adjustable horizontally in a semicircle through the angle α in Fig. 2. The nuts $a$ and the accompanying bolts $b$ shown in Figs. 5 and 6 serve for securing the bearings 2. Into the bore 8 of the bolt $b$ extends the end of a plunger $e$, the said plunger being acted upon by a spring $f$ in the frame 7. At $g$ is shown an angle lever with flexible actuator $h$, by means of which the plunger $e$ can be withdrawn from the bore 8 of the bolt $b$, so that lateral adjustment of the seat back 1 in the guide 3 is made possible. If the seat back is pushed back into the central position the plunger $e$ which has a conical portion $i$ at its front snaps back automatically under the action of spring $f$ into the bore 8. The plunger $e$ can obviously, instead of as shown in Fig. 6, be arranged to co-operate with a suitable part of the seat back, or with a fixed part.

The pilot is secured by means of the shoulder belts 9 and the body belt 11 the belts 9 passing over rollers 10. The seat back 1 is, after release of the bolt $e$ from the bore 8 by means for instance of the Bowden wire $h$, adjustable towards either the left or the right. On the rear side of the back is carried an automatically working belt-holding arrangement 12 which, as usual includes a spiral spring (a compensator) and a brake or locking arrangement for the belts 9. This belt holding arrangement comprises a casing 12 in which, as just mentioned, is disposed a tension device, that is to say a spiral spring such as a clock spring, which exerts on the belts 9 a constant pull if the arrangement, that is to say its action on the shoulder straps, is not cut out by some braking means. This brake operates like a gripping fast of the belts 9 and the pilot must free himself first of all by means of the lever 14 (Figs. 1 and 3). Then he can lean forward against the pull of the tension device in the belt holding device 12. On the rear side (Fig. 3) the belts 9 run together like braces and are secured in a buckle, which in turn is connected to a flexible cord 9' conducted over a guide roller on the rear side of the seat back. The cord 9' is connected to the tension device, spring or the like housed in the casing 12.

Regarding the brake or holding arrangement in the belt holder this can be fashioned as a band brake, so that the spring in the holder 12 is only operative when by means of lever 14 or 15 and the connected Bowden wire the brake is released. The Bowden wire connected to the lever 15 is not shown in the drawings but obviously leads also into the casing 12. The lever 15 is disposed sidewise outside the seat bottom 4 (Figs. 1–3). It has in general only the function of swinging the angle lever 16 in order that the seat bottom can be brought into the upper dotted line position I. The yielding part previously referred to in this description is the tension arrangement which is located in the belt holder that is to say in the casing 12. It can comprise one or more springs or elastic members. The switch arrangement is the lever 14, but, as stated, the belt holder can also be operated through the lever 15.

At the option of the pilot the holding belts 9 may be rigid or yielding. The difference in length of the belts in the two vertical positions I and II of the seat is compensated for by the arrangement 12.

If the seat bottom 4 is moved $= x$ (Figs. 1, 3) to the higher position I, the seat back according to the foregoing description (Figs. 1–6) not being vertically adjustable, so the belt 9 must be lengthened, since the shoulders of the pilot become raised. In the lower position II the body of the pilot and his shoulders are in corresponding position that is to say corresponding to the seat position II. This lengthening of the belts takes place obviously against the pull of the tension arrangement in the belt tensioner 12 and after release of its brake or holding device by means of the lever 14 or 15.

If the guide 3 is not secured to the stays 6 and 7 fixed to the body of the airplane, but to the vertically adjustable seat 4, then naturally on vertical movement of the seat bottom, the belt holding arrangement 12 needs not to be simultaneously released because the latter does move upwardly with the seat, hence with the guide 3 and the seat back 1.

The sidewise adjustment of the seat back is effected by the shoulders of the pilot. He first releases by means of a Bowden wire or equivalent the member 8 shown in Figs. 5 and 6 and turns the upper part of his body sideways so that the back can be moved from the Fig. 2 position to any intermediate position. As he is connected by means of the holding belts 9 with the back 1, so the back moves easily with the swinging of the upper part of the body, all the bearings 2 adjusting themselves along the guide 3.

Naturally two or more guides might be provided one above the other. It may even be expedient to dispose the lower edge of the seat back in a guide, so that the back may be well supported. The seat back can also be connected with the seat bottom 4 by elastic members, springs or the like, so that by the employment of these tension members the use of a bottom guide can be dispensed with.

On a seat according to the invention the pilot can have observation on all sides through an angle of 360°. He can adjust the upper part of his body in a semicircle with the seat back 1 and in addition bend forward if the belts 9 are slackened.

By looking backwards the steering-controlling feet are not affected, as the seat bottom is stationary. A vertically adjustable seat is illustrated, but the invention can be applied to a fixed seat. In particular, buckle belts are not necessary. The seat adjustment is of simple construction and operation, light in weight and adaptable to mass production. At 4' the seat cushion is shown.

The embodiment shown in Figs. 7 and 8 employs for the above mentioned parts similar references. In this case the seat 4 is provided with a pivot column 17 on which the seat back 1 is carried by means of a sleeve 18 pivotal on the upper end of the column. The belts 9 run over a roller 19 to a tension device, which may be constructed similarly to the internal arrangement of the tension device 12 wherein the tension belts are connected to an automatically rolling up and unrolling spiral spring so that the belts 9 yield to the desired movements of the body. The seat back can also as shown in Fig. 8 swing to right and left on the pillar 17.

I claim:

1. An aircraft seat including a seat portion, a substantially horizontal curved guide extending around the rear portion of the seat and spaced above the seat portion, a seat back independent of the seat portion mounted on and movable along said curved guide, stop means on the guide for retaining the back in the middle position, whereby the occupant may turn in all directions.

2. An aircraft seat as claimed in claim 1 further comprising resilient means connecting the back to the seat.

3. An aircraft seat including a seat portion, a substantially horizontal curved guide extending around the rear portion of the seat and spaced above the seat portion, a seat back independent of the seat portion mounted on and movable along said curved guide, stop means on the guide for retaining the back in the middle position, a supporting belt fixed to the back, yieldable means connected to the belt and means for controlling the yieldability of said yieldable means, whereby the occupant may turn in all directions.

4. An aircraft seat as claimed in claim 3 wherein the controlling means consist of a brake on said yieldable means.

5. An aircraft seat as claimed in claim 1 wherein the stop means comprise a roller fixed to the back and positioned in the guide, a spring actuated member engaging said roller and means for actuating said member.

ERICH MEISSNER.